Figure 1:
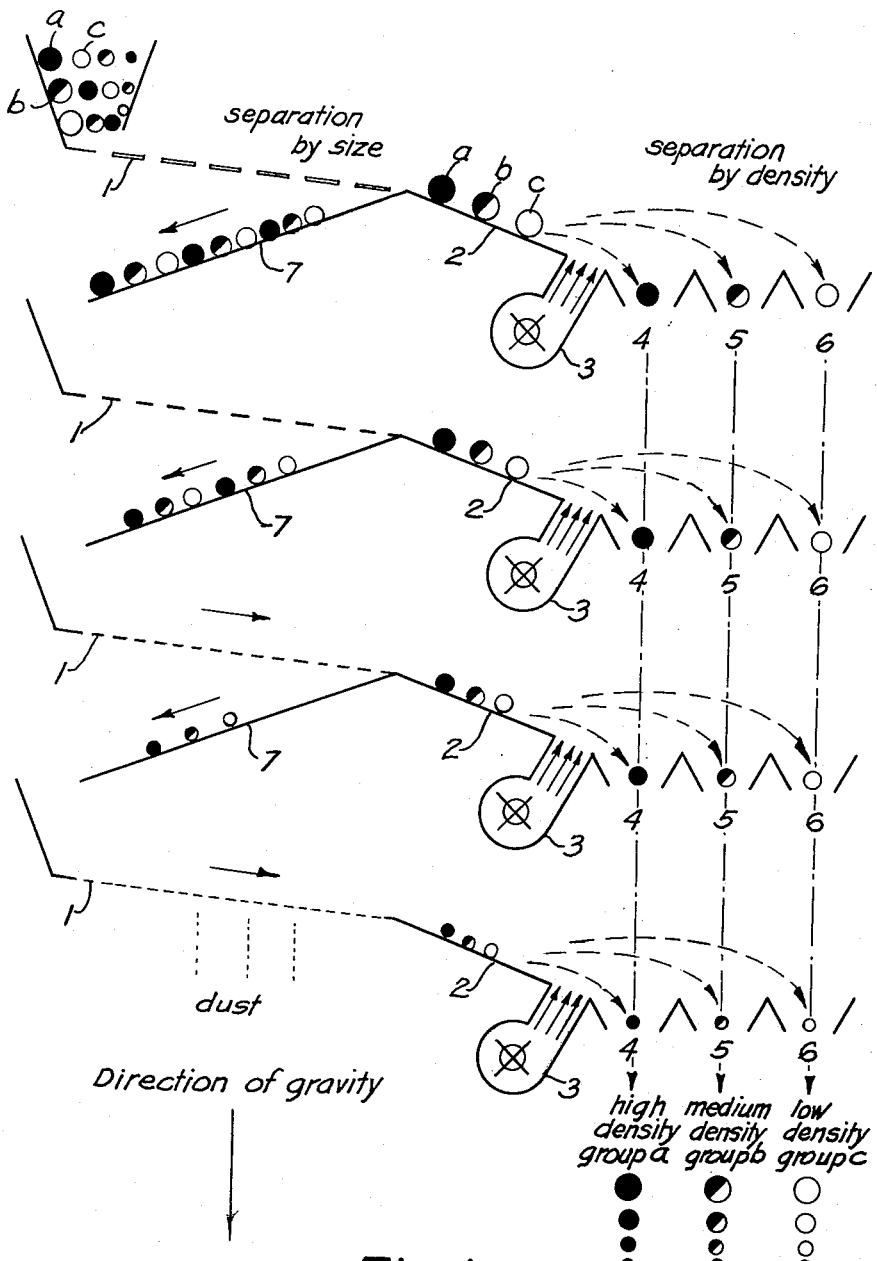

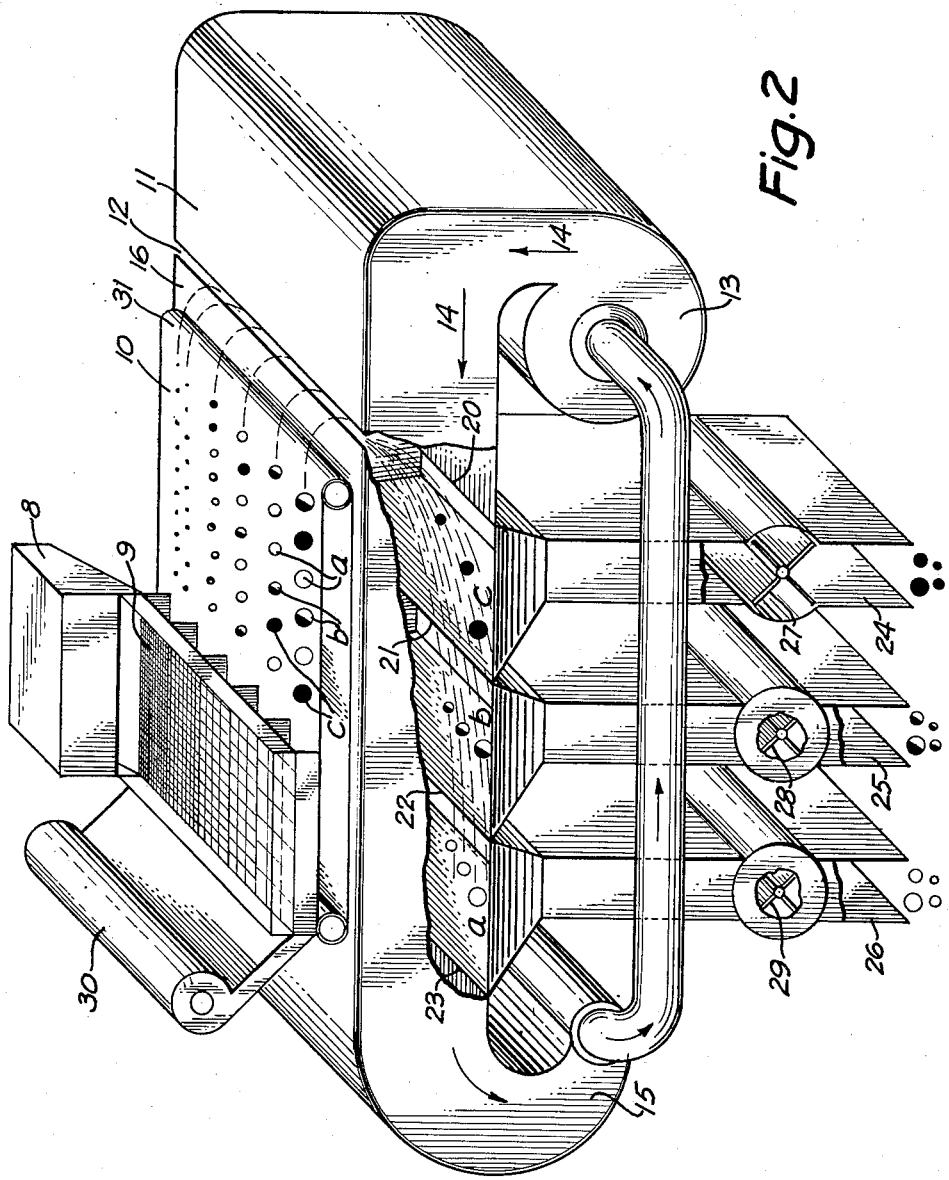

United States Patent Office 3,044,619
Patented July 17, 1962

3,044,619
APPARATUS FOR SORTING SEED MATERIAL
Wilhelm Knolle, 7 Vigilienweg, Bad Durkheim, Germany
Filed Dec. 4, 1959, Ser. No. 857,440
Claims priority, application Germany Dec. 4, 1958
3 Claims. (Cl. 209—33)

The present invention relates to a method for sorting seed material, and an apparatus for carrying out this method.

Various methods for sorting seed material have become known. Most of these methods are a combination of sieving and air-sifting and make use of magnetic separators and sorting tables for separating extraneous matter or broken or damaged seed grains. In all known methods the seed material is separated in three groups, the first group comprising small grains, the second group consisting of medium-sized grains and constituting the main mass of material, and a third group of big grains. The useful material is obtained from the second, main group of medium-sized grains by air-sifting, whereby the light grains are removed. It is also known to first subject the seed material to air-sifting and then separating by sieving.

The known methods suffer from the considerable disadvantage that useful grains, having full germinating power, are retained in the waste fraction of separated grains, whereas the selected mass of useful grains still contains a considerable portion of grains having a small or even substantially no germinating power.

It is, therefore, the object of the present invention to provide for a method and an apparatus for sorting seed material, so as to obtain a highly fertile seed material of high germinating power at a very high yield. Further objects and advantages of the invention will become apparent as the detailed description proceeds.

The objects are achieved by the method of the invention according to which the mass of grains is first divided into a number of fractions or is even graded uninterruptedly, whereupon each single fraction or the uninterruptedly graded material is subject to air-sifting, each fraction being separately subject to air-sifting, thereby separating each fraction into heavy, medium light, and light grains, whereupon the heavy grains of several or all fractions can be joined.

The apparatus for carrying out this method consists of a specially constructed assembly of known elements. The various embodiments of the apparatus are made up of a combination of units known per se, and particularly a sieving unit for dividing the grain mass into a number of fractions of differently sized grains, conveying means for separately conveying the various fractions and air-sifting means for further separating the various fractions according to the density or air-resistance of the individual grains.

The new apparatus of the invention is particularly useful when applied to mixtures of seed material comprising grains of substantially different sizes as, for example, the beta types of seeds, the germinating power of which largely depends on the size of the grains, the fertility generally increasing in direct proportion to the increasing density of the grains. It can thus be used with particular advantage, for example, for sorting sugar beet seeds.

The invention will be better understood upon the following description of the accompanying drawings, wherein FIGURE 1 is only a scheme of the system of the invention;

FIGURE 2 is a schematic side elevational view, partly in longitudinal section, of another embodiment of the apparatus of the invention.

Referring now to the drawings more in detail and turning first to the embodiment shown in FIGURE 1, an assembly of oscillatory sieves 1 is disposed one above the other in such a manner that a sequence of sieves with downwardly decreasing perforations is obtained. The sieves 1 have chute portions 2, on the extreme end of which are positioned fans 3 and, somewhat spaced from the fans, receiving boxes 4, 5 and 6. The grains are presorted by the various sieves 1 according to the size of the grains. The presorted grains are then air-sifted by the blast units 3 in such a manner that the heavy grains fall down into the receiving boxes 4, the medium ones fall down into the boxes 5, whereas the light grains are moved into the boxes 6. Under the sieves 1, back leading slopes 7 are mounted, to convey the grains passing through the higher sieve to the next lower one.

An advantageous embodiment of the apparatus of the invention is shown in FIGURE 2. This apparatus is a combination of known elements with new technical means by which combination an excellent separation with high yield is achieved, the overall size of the apparatus being comparatively small. The apparatus consists of a hopper 8, a sieve with varying holes of increasing size in the direction of movement, a conveyer belt 10 moving at a right angle to the movement of the grains on the sieve, and a wind tunnel 11 whose upper wall has a slot 12. Air is conveyed through the wind tunnel by the fan 13 in the direction indicated by arrow 14 which can be circulated by means of the return conduit 15. The grains fall in an arc through slot 12, during which fall they are slightly presorted. The dust falls upon the edge 16 next to slot 12.

In the air tunnel the grains are further sorted and reach the lowermost portion of the same in which are provided catch sheets 20, 21, 22, 23. Below said sheets and air tunnel 11 are disposed grain-removing means 24, 25, 26, each comprising a shovel wheel 27, 28, 29, allowing the grains to fall downwardly, but preventing air from entering into wind tunnel 11 through outlet slots.

The apparatus consists of a sieve device 9 which is provided with varying holes in order to sift the grains coming out of the hopper 8. The grains are sifted in several sizes and dust. The sifted grains fall onto conveyor belt 10. The sieve supplies grains to belt 10 on which the grains travel, which travel is made more even by fan 30 blowing air on belt 10 at the same speed and in the same direction of travel as the latter. Thus, all grains on the belt have substantially the same speed. As soon as the grains leave the belt they pass into stationary air, so that the heavier grains tend to fall further than the lighter grains. The grains are thus sorted into various fractions, each forming a single-layer like a thin veil. Dust and other fine light particles fall down immediately behind return roller 31.

The fractionated grains pass through slot 12 into wind tunnel 11 through which air is conveyed by means of fan means 13 in opposite direction relative to the direction of belt 10. Due to the air stream in this wind tunnel 11 the grains are further separated according to their density, for example, into a light group a, drawn in white, a useful intermediate group b, drawn half in black and white, nad a heavy group c, drawn in black. The slot 12 is kept small in order to prevent a disturbance of the air stream in wind tunnel 11. Any such disturbance can be further prevented by having a superatmospheric pressure at the entrance of wind tunnel 11, subatmospheric pressure at its end, and normal atmospheric pressure substantially below slot 12.

The various fractions of grains of different weight and density then fall through slots with the slanted sheets 20, 21, 22, 23; preventing rebounding of the grains and missing the outlet slots. The grains then fall through removing channels thereby turning the shovel wheels 27, 28, 29 in counter-clockwise direction and then falling out.

The shovel wheels 27, 28, 29 prevent air from passing through outlets 24, 25, 26 into wind tunnel 11.

It will be understood that this invention is susceptible to modification in order to adapt it to different usages and conditions and, accordingly, it is desired to comprehend such modifications within this invention as may fall within the scope of the appended claims.

What I claim is:

1. An apparatus for sorting seed grains of various sizes and densities according to size and density so as to obtain a high yield of highly fertile seed material of great germinating power, comprising, in combination, hopper means for holding said seed grains, a plurality of sieve means arranged below said hopper means in series for sorting grains according to size, said sieve means having openings of varying dimensions gradually increasing from the side where said hopper means are positioned toward the side opposite thereto, a conveyor belt positioned underneath said sieve means at right angles thereto, a wind tunnel arranged under the lower side of said conveyor belt, said wind tunnel having a slot in its upper wall extending across the tunnel top for the width of the conveyor belt so as to receive the grains as they travel in a trajectory from the conveyor to the slot, said conveyor belt transporting said grains horizontally and throwing them into stationary air so that said grains, all having the same horizontal speed, fall through said slot into the tunnel, a fan producing a flow of air of opposite direction to the movement of the upper side of the conveyor belt, and receiving means for collecting said grains after having been sorted as to density in said wind tunnel.

2. An apparatus as described in claim 1, wherein said wind tunnel has a plurality of grain removing means.

3. An apparatus as described in claim 2, wherein said grain removing means have catch sheets associated with the tops thereof.

References Cited in the file of this patent

UNITED STATES PATENTS

| | | |
|---|---|---|
| 241,560 | O'Brien | May 17, 1881 |
| 1,005,380 | Wear | Oct. 10, 1911 |
| 1,841,333 | Kyle | Jan. 12, 1932 |
| 2,656,922 | Jansen | Oct. 27, 1953 |
| 2,686,591 | Harden | Aug. 17, 1954 |
| 2,697,515 | Guigas | Dec. 21, 1954 |
| 2,717,692 | Brown | Sept. 13, 1955 |
| 2,941,667 | Hilgartner | June 21, 1960 |

FOREIGN PATENTS

| | | |
|---|---|---|
| 72,402 | Sweden | Aug. 11, 1931 |